United States Patent
Harbers et al.

(10) Patent No.: US 7,052,152 B2
(45) Date of Patent: May 30, 2006

(54) LCD BACKLIGHT USING TWO-DIMENSIONAL ARRAY LEDS

(75) Inventors: Gerard Harbers, Sunnyvale, CA (US); William D. Collins, III, San Jose, CA (US)

(73) Assignee: Philips Lumileds Lighting Company, LLC, San Jose, CA (US)

( * ) Notice: Subject to any disclaimer, the term of this patent is extended or adjusted under 35 U.S.C. 154(b) by 174 days.

(21) Appl. No.: 10/678,541

(22) Filed: Oct. 3, 2003

(65) Prior Publication Data
US 2005/0073495 A1   Apr. 7, 2005

(51) Int. Cl.
F21V 9/16       (2006.01)
G02F 1/13357   (2006.01)

(52) U.S. Cl. .......... 362/30; 362/84; 362/230; 362/240; 362/246; 349/71

(58) Field of Classification Search .......... 362/29, 362/30, 600–634, 84, 230, 240, 246; 349/71
See application file for complete search history.

(56) References Cited

U.S. PATENT DOCUMENTS

| | | | | |
|---|---|---|---|---|
| 4,907,862 A | | 3/1990 | Suntola | |
| 5,132,825 A | | 7/1992 | Miyadera | |
| 5,143,433 A | * | 9/1992 | Farrell | 362/29 |
| 5,410,345 A | | 4/1995 | Eichenlaub | |
| 5,463,280 A | * | 10/1995 | Johnson | 315/187 |
| 5,504,661 A | | 4/1996 | Szpak | 362/30 |
| 5,661,645 A | | 8/1997 | Hochstein | |
| 5,783,909 A | | 7/1998 | Hochstein | |
| 5,897,201 A | | 4/1999 | Simon | 362/268 |
| 5,982,092 A | | 11/1999 | Chen | 313/512 |
| 6,007,209 A | * | 12/1999 | Pelka | 362/30 |
| 6,068,383 A | * | 5/2000 | Robertson et al. | 362/84 |
| 6,160,596 A | * | 12/2000 | Sylvester et al. | 349/61 |
| 6,504,301 B1 | | 1/2003 | Lowery | 313/512 |
| 6,521,879 B1 | | 2/2003 | Rand et al. | |
| 6,582,103 B1 | | 6/2003 | Popovich et al. | 362/307 |
| 6,799,865 B1 | * | 10/2004 | Ellens et al. | 362/240 |
| 6,883,950 B1 | * | 4/2005 | Adachi et al. | 362/555 |
| 2002/0008841 A1 | | 1/2002 | Ohmuro | |
| 2002/0145041 A1 | | 10/2002 | Muthu et al. | |
| 2002/0145685 A1 | | 10/2002 | Mueller-Mach et al. | |
| 2002/0158583 A1 | | 10/2002 | Lys et al. | |
| 2003/0011559 A1 | | 1/2003 | Adachi et al. | |
| 2003/0042845 A1 | | 3/2003 | Pires et al. | |
| 2003/0043107 A1 | | 3/2003 | Ruby et al. | |
| 2003/0063062 A1 | | 4/2003 | Tsumura et al. | |
| 2003/0090455 A1 | | 5/2003 | Daly | |

(Continued)

FOREIGN PATENT DOCUMENTS

EP     1 152 642 A2     11/2001

(Continued)

OTHER PUBLICATIONS

Partial European Search Report and Annex to the European Search Report, 9 pages.

(Continued)

*Primary Examiner*—Alan Cariaso
*Assistant Examiner*—James W Cranson, Jr.
(74) *Attorney, Agent, or Firm*—Patent Law Group LLP; Brian D. Ongonowsky

(57) ABSTRACT

One embodiment of the invention provides a backlight for an LCD display. The backlight uses a two-dimensional array of single color or white LEDs and a diffusing or phosphor coated cover plate. Various electrical connections of the LEDs and various phosphor color-conversion techniques are described.

31 Claims, 15 Drawing Sheets

U.S. PATENT DOCUMENTS

2003/0164904 A1    9/2003    Grohn et al.

FOREIGN PATENT DOCUMENTS

| EP | 1 229 377 A2 | 8/2002 |
|---|---|---|
| EP | 1 256 835 A2 | 11/2002 |
| GB | 2 311 643 A | 10/1997 |
| WO | WO 00/65880 | 11/2000 |
| WO | WO 02/069030 A2 | 9/2002 |
| WO | WO 02/075440 A1 | 9/2002 |

OTHER PUBLICATIONS

U.S. Appl. No. 10/442,346, filed May 21, 2003, entitled "Devices For Creating Brightness Profiles", 21 pages.

Communication including European Search Report and Annex to the European Search Report, 13 pages.

* cited by examiner

Cross Section

Front

LCD BACKLIGHT USING TWO-DIMENSIONAL ARRAY LEDS

FIELD OF THE INVENTION

This invention is related to backlighting a liquid crystal display (LCD) panel and, in particular, to backlighting an LCD panel with light emitting diodes (LEDs).

BACKGROUND

LCD TVs and monitors use backlights consisting of arrays of cold cathode fluorescent lamps (CCFLs) to create a visible image on the LCD. For large displays a direct backlight type is used, where the lamps are directly placed behind the LCD, as shown in FIG. 1A. FIG. 1A shows the CCFLs 10, a diffuser plate 12, and an LCD panel 14. Disadvantages of using CCFLs are that they require mercury, have a low color gamut, and have a limited brightness.

Alternative solutions have been proposed that use LEDs, which use either a waveguide and edge illumination, or a direct backlight with side emitting LEDs (i.e., U.S. application Ser. No. 10/442,346, assigned to Lumileds Lighting U.S. LLC). In both approaches, a long mixing length is created to deal with the flux and color variations that are inherent to LEDs. In the direct backlight approach, each LED illuminates a large area of the LCD, or, in other words, each pixel of the LCD is illuminated by a large number of LEDs such that variations in output of each LED do not show up in the LCD image. In the edge lit as well as the side-emitting direct backlight approach, the flux and color mixing properties come at an efficiency penalty.

In U.S. Pat. No. 6,582,103 B1 (to John Popovich et al, assigned to Teledyne Lighting and Display Products), low profile LED illumination fixtures are proposed, consisting of a cavity, including reflective walls, an output aperture, and at least one point source, such as an LED. In this patent, a diffuser covers the output aperture, and each LED includes a side-emitting lens. The solution presented in the present application does not require such side-emitting lens. Other distinguishing feature exist.

A complete other illumination approach was introduced by Whitehead et al. of the University of British Columbia in Canada (WO 02/069030 A2; SID 03 Digest, Helge Seetzen, Lorne A. Whitehead, A High Dynamic Range Display Using Low and High Resolution Modulators, p. 1450–1454), who proposed and demonstrated, as shown in FIG. 1B, an array of LEDs 16 directly behind the LCD 18. Only a few pixels 20 are illuminated by a single LED. The benefit of this approach is that the intensity of the LEDs can be modulated to represent the low spatial frequencies in the image, while the LCD modulates the high frequencies. The big advantage of this is that the dynamic range and contrast of the display are greatly enhanced (16 bit versus 8 bit displays). This is of great advantage in professional (e.g., medical) applications, but would create much better picture quality for an LCD display as well. One of the big challenges in this approach is the variation in color and flux of the LEDs. This is especially true if red, green, and blue LEDs are used to create white, but for white LEDs as well. Without a sufficient density of the LEDs, it will be very difficult to get adequate brightness uniformity with the configuration as suggested by Whitehead. Another disadvantage of this approach is the cost of the system. In the SID03 paper, it is suggested to place the LEDs at a pitch of 5 mm. For a 37" diagonal LCD-TV, 16,000 LEDs would be required. Besides the cost, one has to cope with driver and connection reliability issues as well.

Another illumination approach where a high efficiency LCD display is obtained is disclosed by Mueller-Mach et al. in U.S. application publication US2002/0145685A1, assigned to Lumileds Lighting U.S., LLC. In this illumination scheme, a blue backlight is used in combination with a phosphor dot pattern consisting of red and green phosphor dots, which are aligned with LCD pixels representing the red, and green image pixels, respectively, while the blue pixels are left blank or applied with a non-phosphor scattering material. A related approach was suggested by Gallen et al. (WO 02/075440) where an UV or near UV emitting LED array was used, and red, green, and blue phosphors where applied (screen printed) onto the LCD. A collimating means is used to limit the cross-talk between the LCD pixels and the phosphor dots. Both applications have the advantage that the color uniformity is determined by the phosphor and the phosphor printing process, and that the system efficiency can be very high, as the absorbing color filters are no longer needed. However, efforts in this area have not yet resulted in introduction of this technology to the market.

SUMMARY

One embodiment of the invention provides a backlight for an LCD display, having a high efficiency, good color uniformity, and spatially and temporal adjustable luminance profile, for obtaining better contrast and lower power consumption at a low cost. The backlight uses an array of single color or white LEDs and a diffusing or phosphor coated cover plate. To obtain a high efficiency, no additional optics is used in between the LEDs and the cover plate. In this invention, a good compromise has been found between color and flux mixing properties of the LEDs and control over the luminance profile.

DETAILED DESCRIPTION

Figure 1A:
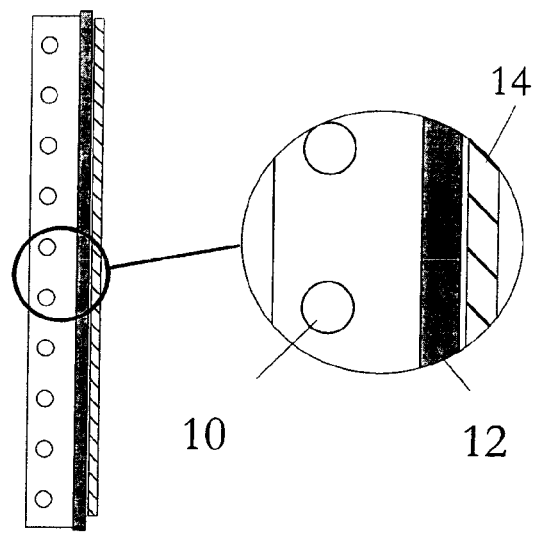
FIG. 1A illustrates a prior art LCD backlight approach using CCFLs.
Figure 1B:
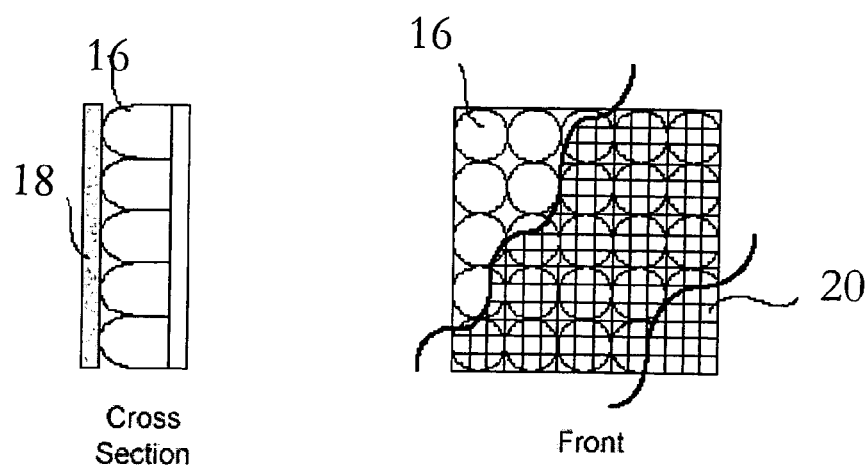
FIG. 1B is a cross-section and a partial front view of a prior art LCD backlight using a densely packed array of LEDs.
Figure 2:
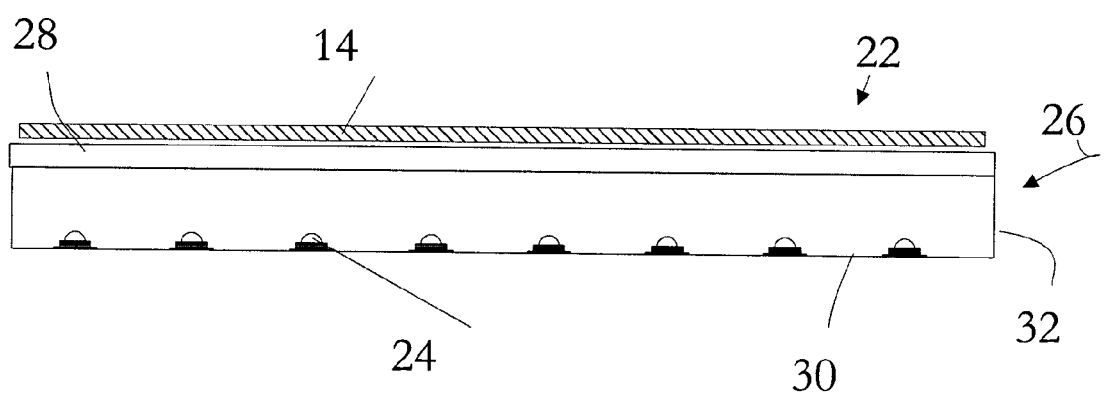
FIG. 2 is a side view of an LCD using a backlight in accordance with one embodiment of the invention.

FIG. 2A is a side view of an LCD display 22. An array of LEDs 24 is placed on the rear panel of the backlight 26. The backlight 26 is covered with a diffusing cover plate (diffuser 28). The diffuser 28 is for example made of acrylic or glass, with a roughened surface for diffusing light. Alternatively, the diffuser 28 may have light scattering particles with the acrylic or glass sheet. Many types of diffusers are known and may be used with the backlight 26. A transparent plate may be used instead of the diffuser 28 if the light output of the backlight 26 is sufficiently diffused without a diffuser. Additional films (not shown) for increasing the brightness or efficiency might be used on top of the diffuser, just before the LCD, as for example Brightness Enhancement Film and Dual Brightness Enhancement Film, as for example produced by 3M.

The back plane 30 and the sidewalls 32 of the backlight 26 are covered with high reflective materials. Good results have been obtained with a white diffuse reflective film on the back (e.g., E60L, produced by Toray, Japan), and a specular reflecting material on the sidewalls (e.g., Miro material, as produced by Alanod, Germany), but other configurations work as well. The materials used should have a high coefficient of reflection, preferably >90%. By using these high reflective materials, a high recycling efficiency is achieved. This is in particular important when Brightness Enhancement Films are used, as mentioned above, as these films reflect the light which can not be used in the first pass, and which needs to be recycled in order to contribute to the output of the LCD during a second or third pass.

The LCD panel 14 is placed in front of the backlight 26. The LCD panel 14 may be a conventional LCD, having a first polarizing filter, a thin film transistor array for developing an electric field across selected areas of the liquid crystal layer, a liquid crystal layer, an RGB color filter array, and a second polarizing filter. The color filter array has red, green and blue subpixels. Between the LCD panel 14 and the backlight 26, additional films can be used, such as a brightness enhancement film (BEF) or polarization recovery film (DBEF).

Figure 3A:
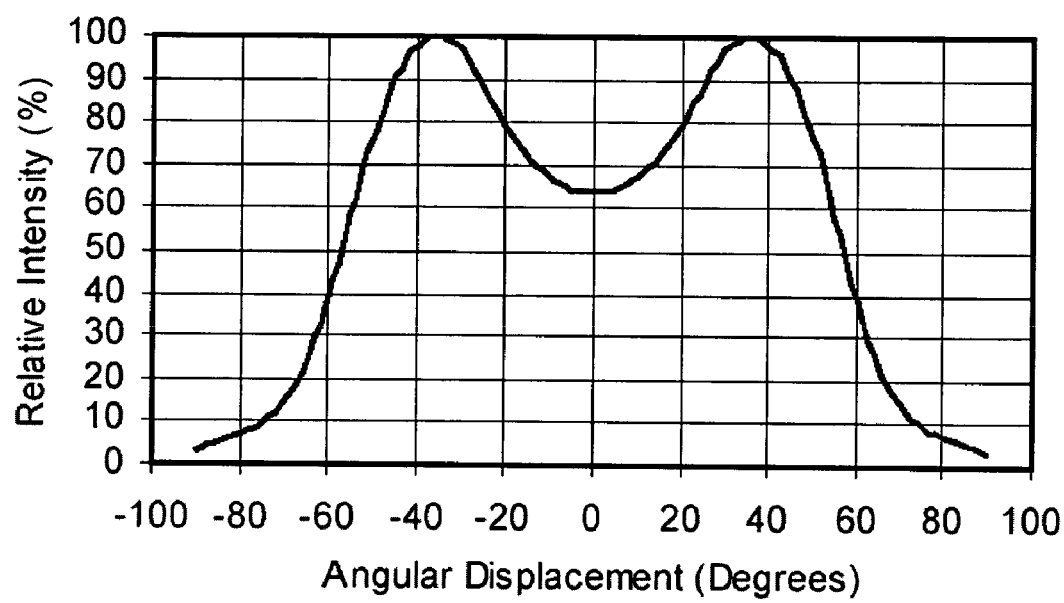
FIGS. 3A and 3B are graphs of light intensity vs. angular displacement for two types of LEDs that may be used in the backlight of FIG. 2A.
Figure 3B:
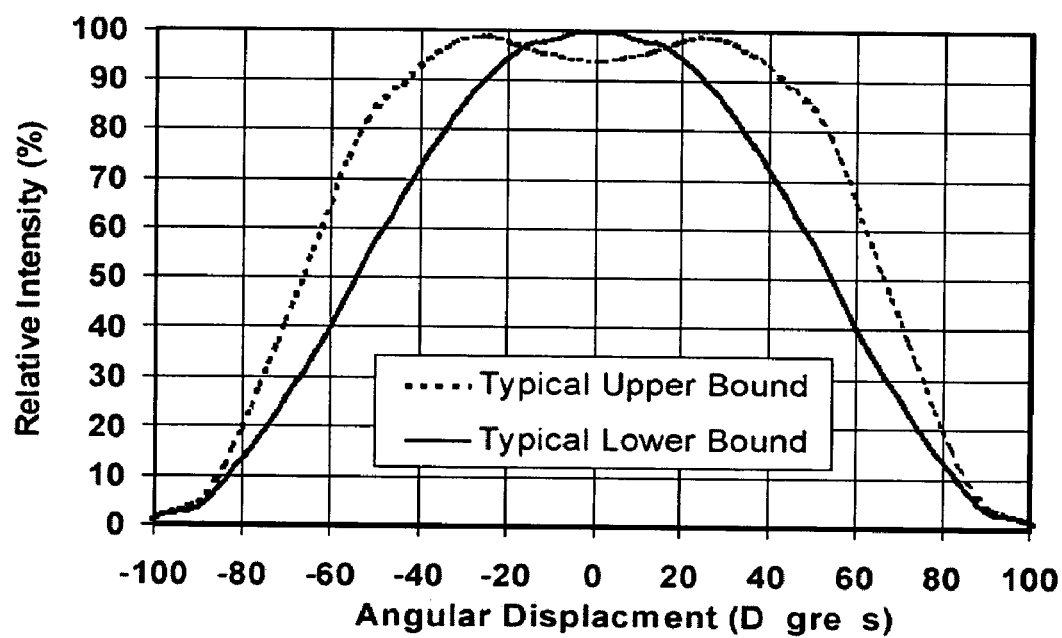

The preferred intensity profiles of each LED 24 for obtaining a good balance between light mixing and luminance control are shown in FIGS. 3A and 3B. FIG. 3A shows an example of a Batwing type intensity pattern, and FIG. 3B shows a so-called Lambertian radiation profile. These types of LEDs are produced by Lumileds (LXHL-BW01 & LXHL-BR02 for the batwing white and blue, and LXHL-PW01 & LXHL-PR03 for the Lambertian type white and blue).

Figure 4:
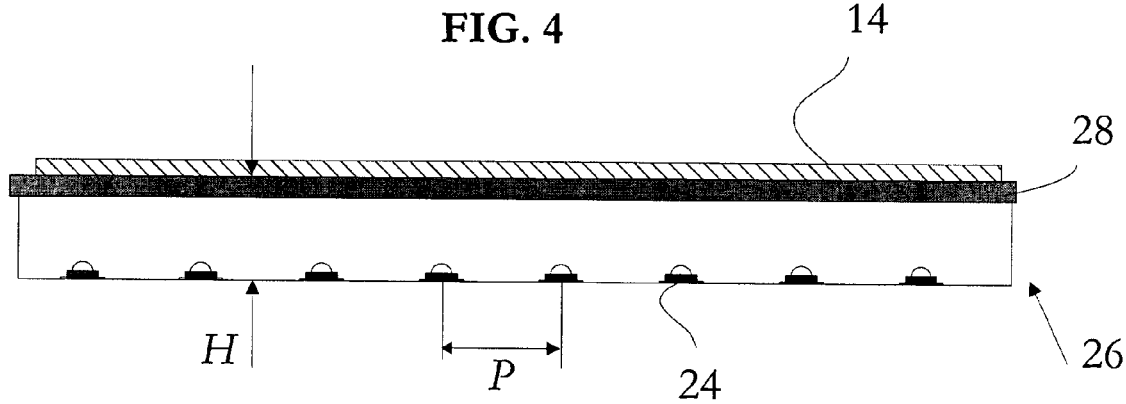
FIG. 4 illustrates the preferred ratio of the height (thickness) of the backlight and the pitch of the LEDs.

FIG. 4 shows the preferred relationship between the total thickness (H) of the backlight 26 and diffuser 28 and the pitch (P) of the LEDs 24. We found that, if the thickness is between 0.3 times and 1.2 times the pitch of the LEDs, the best results are obtained with respect to uniformity, and luminance profile control. For example, good results were achieved with a 16" (diagonal) backlight, with a thickness of 40 mm and an LED pitch of 50 mm. In this case 31 Lumileds Luxeon™ Lambertian emitters where used. The power of these emitters is between 1 and 3W. For a 32" display, using the same pitch and thickness, about 124 LEDs would be needed. When lower power LEDs are used, like for example Nichia surface mount devices, with an average power of 0.15W, about 6×–20× as many LEDs are required to achieve the same performance, but the pitch of the LEDs would of course be smaller, and therefore the thickness as well. In another example, the pitch of the LEDs used in the present backlight is 20 mm or greater.

Figure 5:
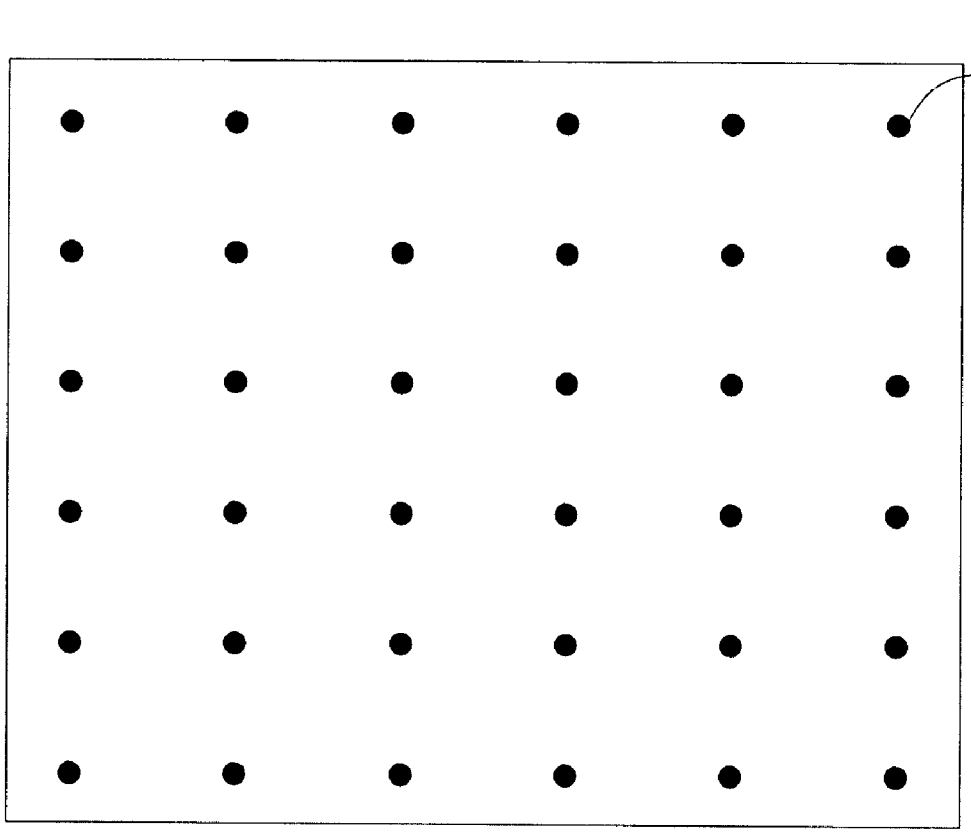
FIGS. 5 and 6 illustrate two possible arrangements of the LEDs in the backlight.

FIG. 5 shows one example of the layout of the LEDs 24 in the backlight 26. In this case, the LEDs 24 are placed in a square pattern using 36 LEDs. The actual number of LEDs needed depends on the size of the display, the luminous flux of each LED, and the required brightness. As LEDs do vary in light output and efficiency with production tolerances, and for a cost effective solution all LEDs have to be used (high yield), and in general the center of the display will have a higher brightness (luminance) than the edge of the display, it is preferred to put the most efficient, highest output LEDs in the center of the backlight and the less efficient dimmer parts near the edge of the backlight.

Figure 6:
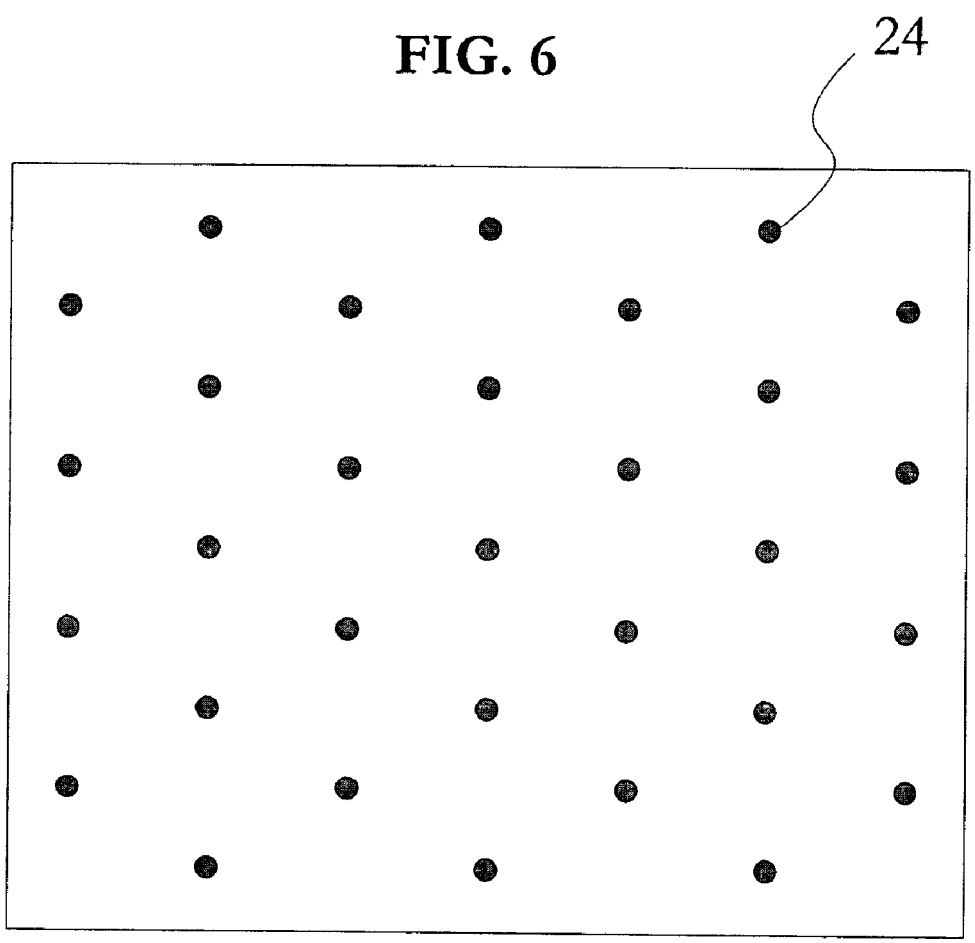

An alternative configuration of an LED layout is shown in FIG. 6, where a layout using 31 LEDs is shown, and where the LEDs are places in a hexagonal structure. This layout has the advantage that each LED has six equidistant neighbors, and that the brightness of individual LEDs are averaged over its neighbors.

Figure 7A:
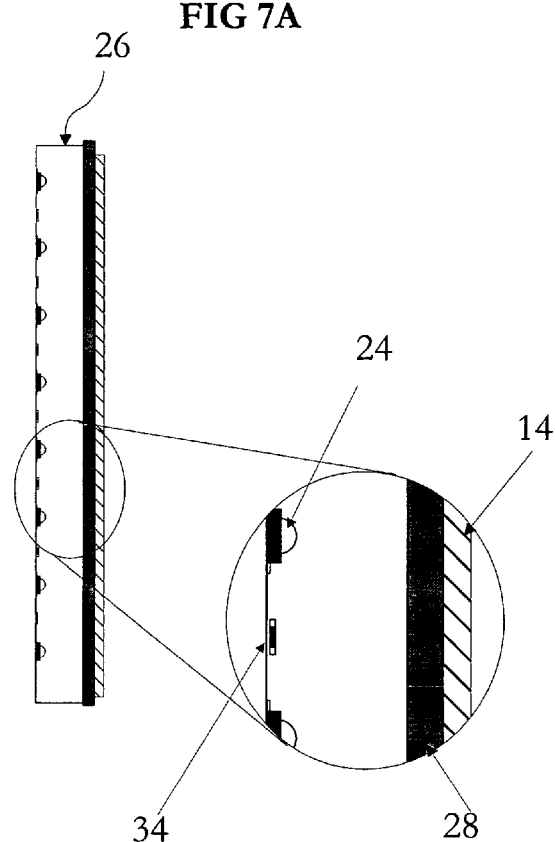
FIG. 7A illustrates the use of a light sensor in the backlight for adjusting the brightness of the LEDs or LCD output to compensate for degradation of the LEDs' light output.

LEDs do degrade over time, and it can happen that nonuniformities will occur if the LEDs degrade differently. By including sensors in the backlight this degradation can be measured and can be compensated for by either adjusting the drive currents of the LEDs or by adjusting the transmission of the LCD, by changing the grey values of the pixels. FIG. 7A illustrates an arrangement where in between the LEDs 24 a light sensor 34 is placed to measure the luminance (brightness) uniformity over the backlight 26. Of course, placing the sensors 34 at larger spacing than the LEDs can lower the number of sensors. A preferred configuration is where the spacing of the sensors is between 1× and 3× the spacing of the LEDs.

Figure 7B:
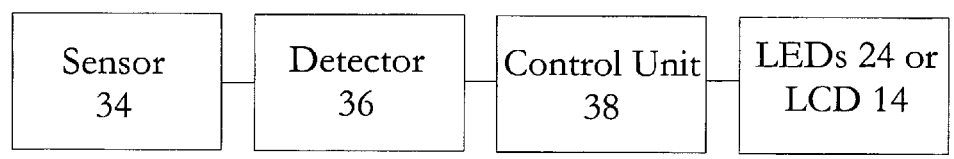
FIG. 7B is a block diagram of one technique for receiving the sensor signals and adjusting the brightness of the LEDs or the LCD output.

FIG. 7B illustrates one type of circuit that detects the sensor 34 signals and controls the LEDs or LCD panel to compensate for degradation of the LED brightness. The detector 36 samples each sensor 34 output using any suitable technique, such as by multiplexing. A sensor 34 that measures a reduced light output is associated with one or more specific LEDs 24 in the array or a group of pixels in the LCD panel 14. A control unit 38, such as a current supply for the LEDs or an LCD controller, then adjusts the current to the affected LEDs or controls the gray scale level of the affected LCD pixels to compensate for the brightness degradation. Other suitable techniques may be used.

Figure 8A:
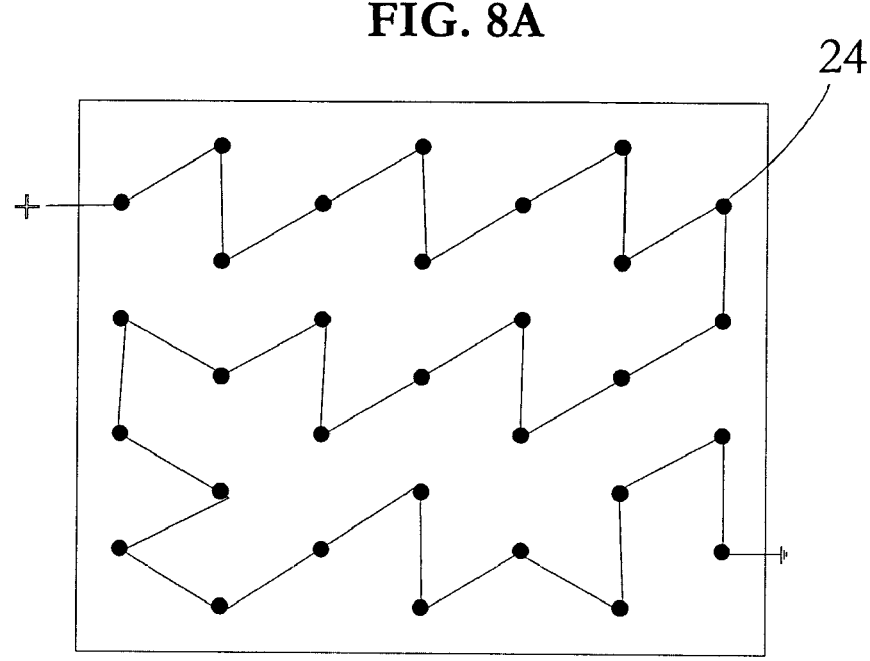
FIGS. 8A, 8B, 9, 10, 11A, and 11B illustrated different wiring configurations for the LEDs in the backlight.

FIG. 8A shows an electronic driving scheme for the backlight 26. In this example, 31 LEDs 24 are connected in series. Such a configuration is especially suited to reduce the costs of an electronic driver or inverter, as the forward voltage per LED is approximately 3.5V, and the total voltage of 31 LEDs in series approximates 110V, which is the standard supply voltage in the U.S. and Japan. In such a case, the driver can consist of a simple rectifier and smoothing capacitor to drive this string of LEDs. More or less LEDs would be connected in series depending on the voltage drop across each LED or the power supply voltage.

Figure 8B:
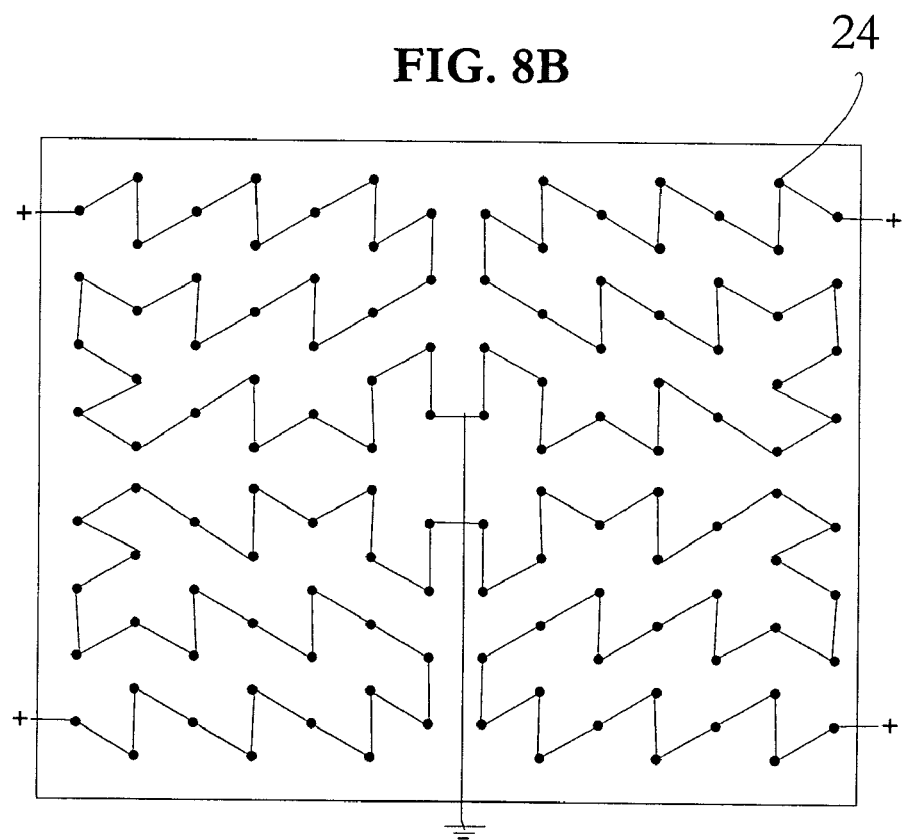

FIG. 8B shows a similar configuration, but for a bigger backlight and using four strings of approximately 31 LEDs. In this case, the four strings of LEDs could even be used as diodes in the power supply full-wave rectifier, reducing the costs of the driver even further.

A preferred embodiment of the invention is where the LEDs are driven in groups, where the LEDs are connected in series, and where the forward voltage of each group matches the supply voltage of the power grid. For the U.S. and Japan, where this voltage is about 110 V, every group would contain between 28 and 37 LEDs in series. For Europe and other countries, this supply voltage is between 220 and 240V, resulting in about 60 to 80 LEDs per group.

Figure 9:
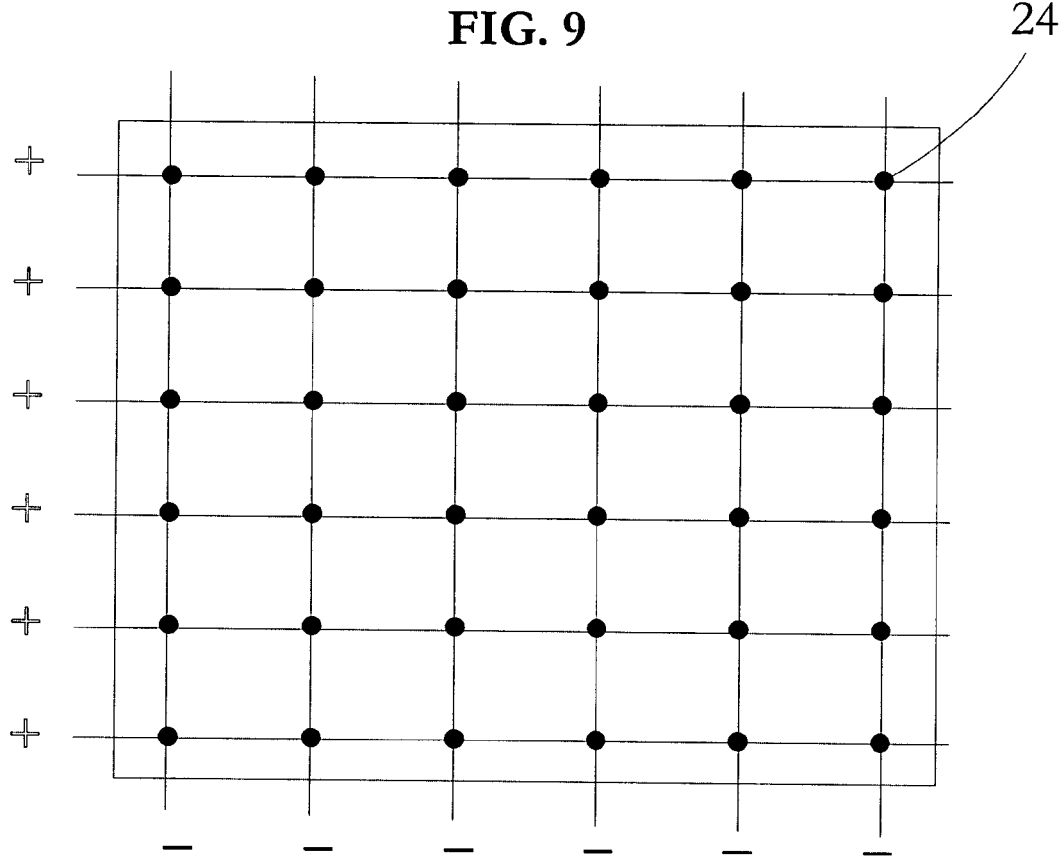

If lowest cost is not the primary concern, but lower power consumption and high contrast are key requirements for the application, which is the case for high-end LCD-TV, other driving schemes are more preferred. An extreme example for this category is shown in FIG. 9, where every LED can be driven independently. In this configuration, the LEDs are connected in a matrix, and the LEDs can be driven row at a time, or column at a time, where every LED in a row or column can be driven at a different power. Especially the row-at-a-time option is attractive, since it resembles the way images are produced on a cathode ray tube (CRT), and the motion artifacts are greatly reduced.

Figure 10:
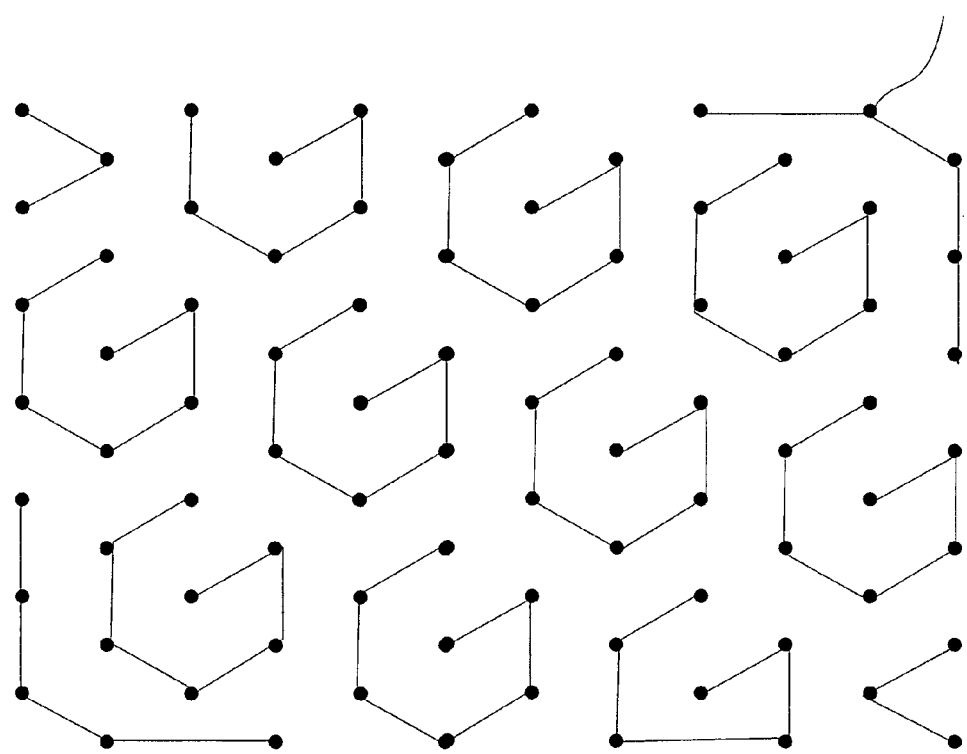

A different driving scheme, where the LEDs 24 are driven in groups between three and seven LEDs, is shown in FIG. 10. In this example, the hexagonal structure is used for 14 groups, where each group can be driven independently.

Figure 11A:
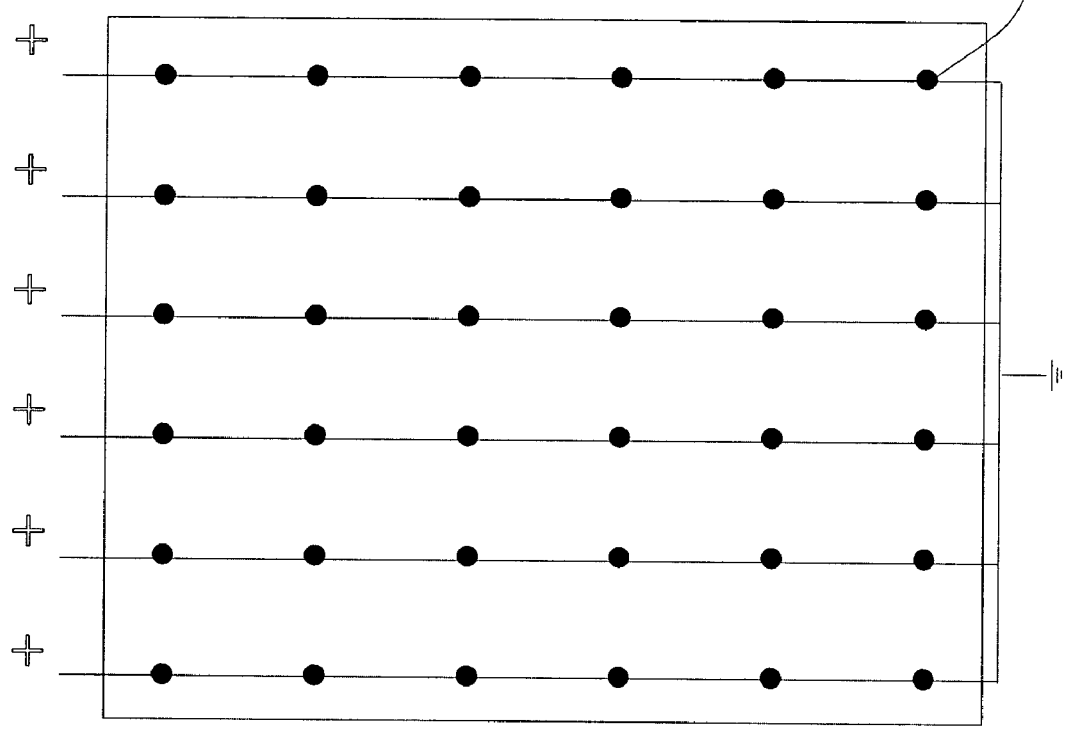

FIG. 11A shows a simple geometry where the LEDs 24 are connected in series per row, and each row can be operated independently. This example shows six LEDs per row, but of course the actual number of LEDs depends on the size, thickness and brightness of the display. In this configuration, the brighter LEDs would be placed in the center of the display, while the dimmer parts would be placed towards the side of the backlight.

Figure 11B:
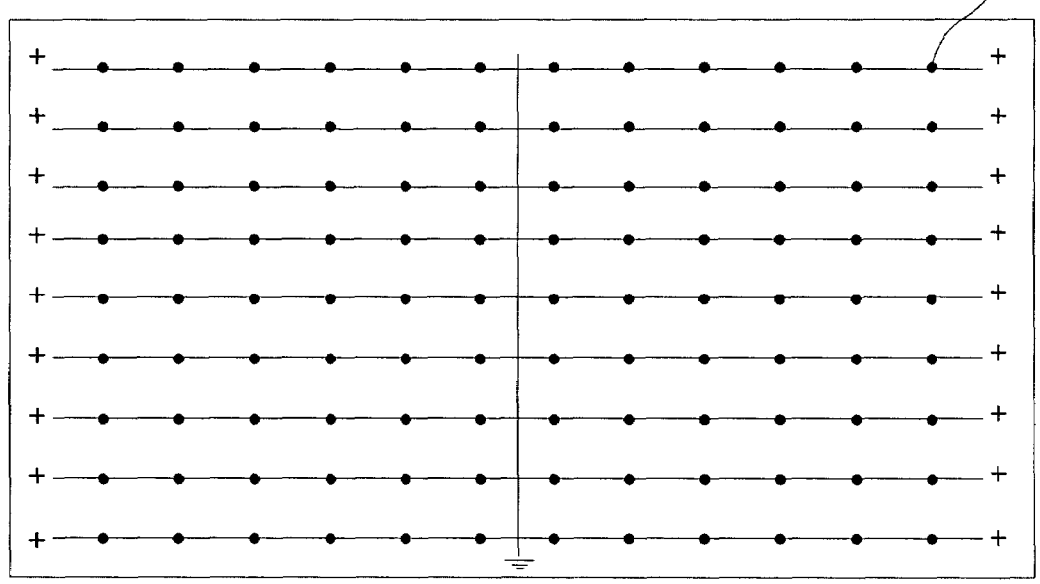

An example of such geometry for a bigger display, where the left half of the display can be driven independently of the right half of the display, is shown in FIG. 11B. Of course, this configuration can be extended to operate the backlight in three segments as well, which is preferable for the large wide format screens.

Figure 12A:
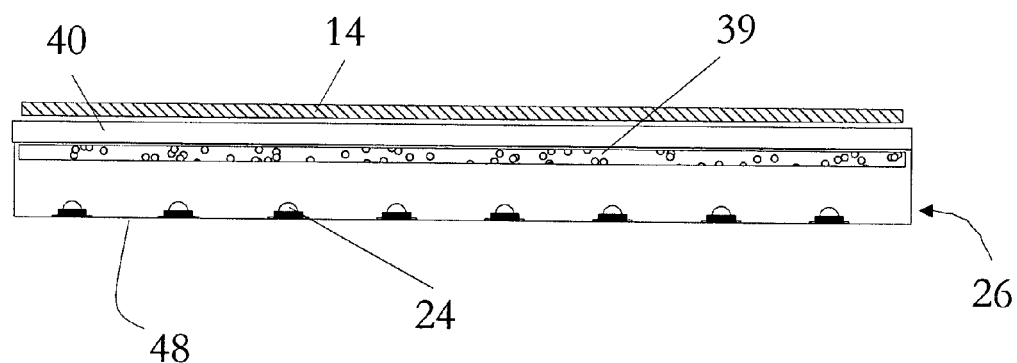
FIGS. 12A, 12B, 12C, 13A, and 13B illustrate various techniques for phosphor-converting the LED light output.

FIG. 12A shows a backlight configuration when only blue, UV, or near-UV LEDs are used, and where the color-converting phosphor layer 39 is on the cover plate 40. The cover plate 40 may or may not be a diffuser, depending on the amount of diffusing performed by the phosphor. The phosphor layer 39 is a uniform layer, consisting of one or more different type of phosphors. Preferably, a green and a red phosphor are used, but a yellow (YAG) phosphor could be used as well. This layer 39 can, for example, be applied by spray painting, screen-printing, or electrophoretic deposition, or might be a film with uniform density of particles or a luminescent dye distributed throughout the film. This configuration is attractive because the phosphor is not on top of the LED die, and light emitted from the phosphor to the rear of the backlight 26 has a larger recycling efficiency than into the LED chips, due to the high reflectivity of the films used in the backlight 26. And in addition to the recycling efficiency, the phosphor can be operated at a lower temperature and does not have chemical compatibility issues with the LED die, improving the efficiency and lifetime considerably. From a logistics point of view, this solution is attractive as well, as the blue backlight can be used for a large range of different displays, with different types of color filters, and only the phosphor layer thickness and phosphor concentration has to be optimized to fit a particular LCD.

If blue LEDs 24 are used that match the desired blue pixel color of the LCD, then some blue-light transmissivity of the green-red phosphor layer is desirable so that red, green, and blue light components are transmitted to the LCD.

In another embodiment, one type of phosphor is applied to the cover plate 40, preferably the green or amber phosphor, while another phosphor, preferably the red phosphor, is applied to the rear panel 48 of the backlight configuration. The rear panel acts as a diffuser. This phosphor is not applied as a uniform coating, but is applied as a dot pattern. The combination of blue light from the LEDs and the red and green light from the phosphor layers produces a substantially white backlight for the LCD panel. By separating the phosphor in such a configuration, higher conversion efficiency is achieved, while by optimizing the size and spacing of the phosphor dots the required color balance and gamut can be achieved.

Figure 12B:
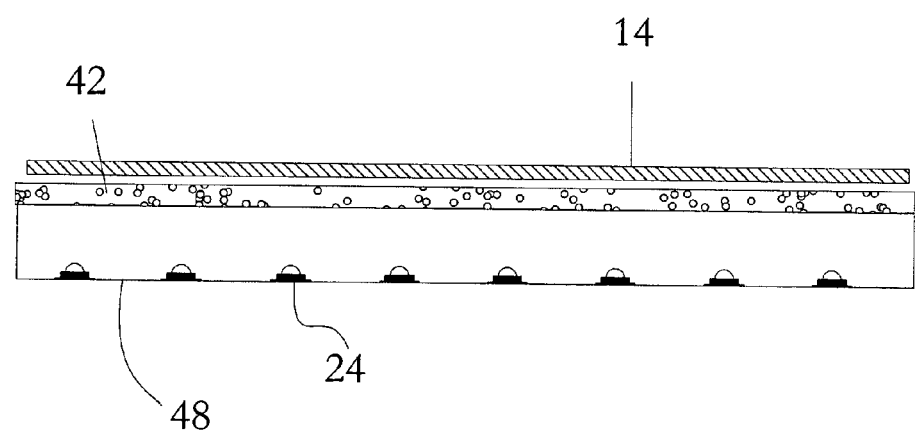

FIG. 12B shows an alternative configuration, where the phosphor is integrated into the cover plate 42. Cover plate 42 may or may not provide additional diffusion, depending on the diffusion performed by the phosphor.

Figure 12C:
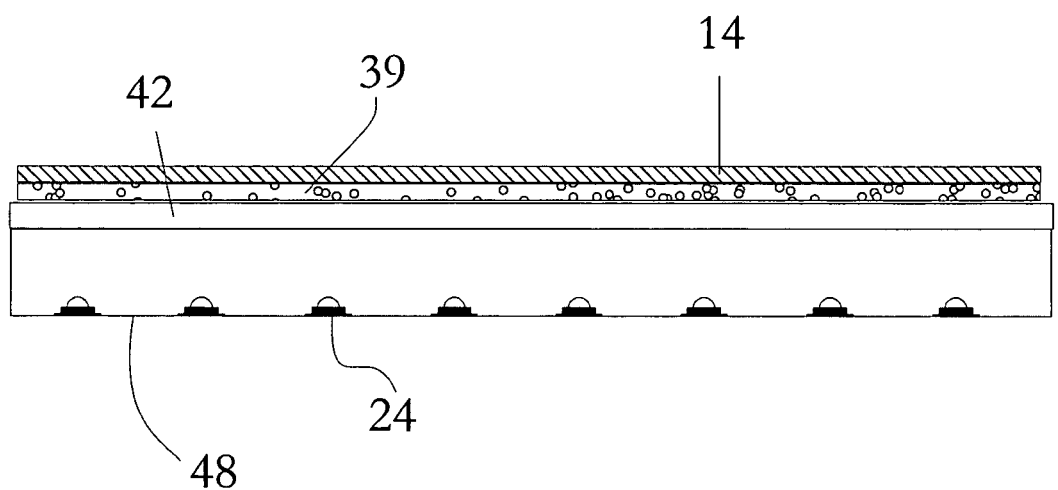

FIG. 12C shows another embodiment, in which a uniform phosphor coating 39 is applied directly onto the LCD 14, more specifically, on the TFT array glass. Applying phosphors to glass is a well-developed and inexpensive process. Furthermore, by integrating the phosphor onto the LCD, the number of parts is reduced.

Figure 13A:
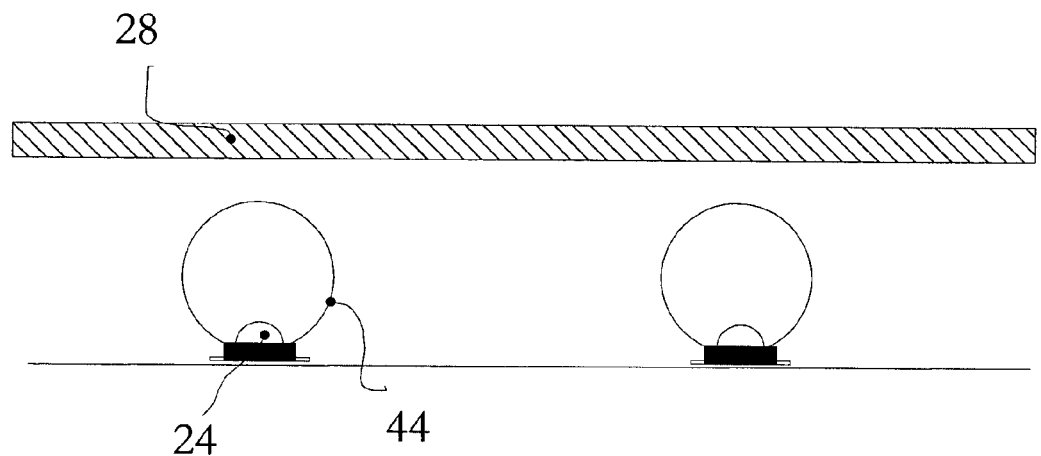
Figure 13B:
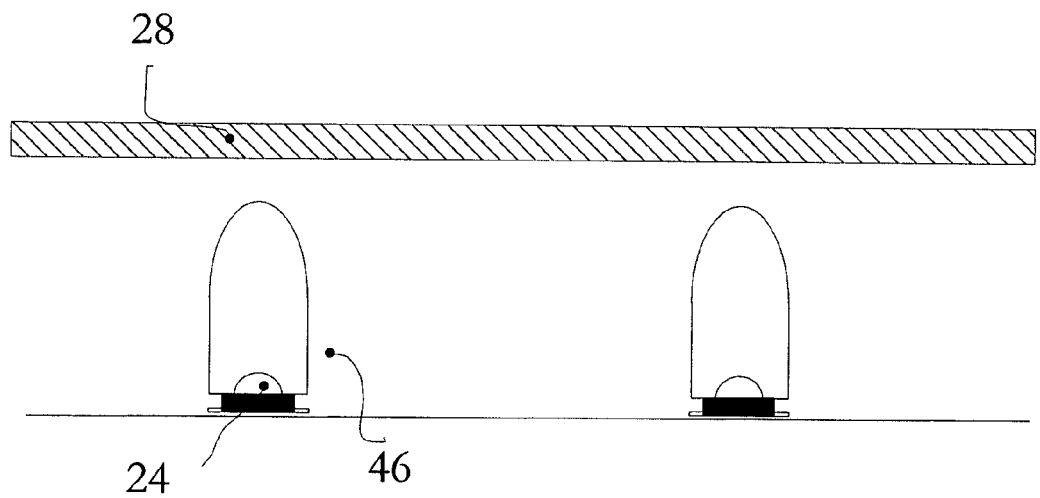

FIGS. 13A and 13B show a configuration where a phosphor bulb 44 or 46 is formed around the blue LED 24, effectively creating a white lamp. In this approach, the mixing is done in two stages, first in the bulb, and second, between the bulb and the diffuser 28. For large spacing of the LEDs, this configuration has the benefit that the amount of phosphor used is smaller than it would be had the phosphor coated the cover plate. In another embodiment, phosphor is deposited directly on the LED chip.

Although red, green, and blue LEDs in the array may be used if the pitch is small enough, it is preferable to use either all LEDs of a single color or white light LEDs (e.g., using a phosphor bulb) to obtain better color uniformity at the output of the backlight.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is claimed is:

1. A display device comprising:
    a housing comprising reflective surfaces and a top opening through which light is emitted for backlighting a liquid crystal display (LCD) panel;
    an array of substantially identical light emitting diodes (LEDs) supported on a reflective bottom surface in the housing, the LEDs being separated from one another by a distance greater that the width of a single LED, wherein the housing has a height, and wherein a ratio of the height to a pitch of the LEDs is between approximately 0.3 to 1.2; and
    a diffuser above the LEDs for providing diffused light to an LCD panel.

2. The device of claim 1 further comprising an LCD panel over the diffuser.

3. The device of claim 1 wherein a pitch of the LEDs is greater than 20 mm.

4. The device of claim 1 wherein each of the LEDs output light having red, green, and blue components.

5. The device of claim 1 wherein the LEDs comprise only blue LEDs.

6. The device of claim 1 wherein the LEDs comprise only UV or near-UV LEDs.

7. The device of claim 1 further comprising phosphor over the LEDs to convert light output by the LEDs into at least red and green light.

8. The device of claim 1 further comprising phosphor over the LEDs to convert light output by the LEDs into red, green, and blue light.

9. The device of claim 1 further comprising a phosphor layer beneath the diffuser.

10. The device of claim 1 further comprising a phosphor layer deposited on the diffuser.

11. The device of claim 1 further comprising phosphor surrounding top and side portions of each LED for color-converting light emitted by the LEDs.

12. The device of claim 1 wherein the diffuser comprises a phosphor, and the phosphor performs a diffusing function.

13. The device of claim 1 wherein a number of LEDs are connected in series, a total voltage drop across the serially connected LEDs approximately equaling a publicly supplied standard voltage.

14. The device of claim 1 wherein a number of LEDs are connected in series, a total voltage drop across the serially connected LEDs approximately equaling a publicly supplied standard AC supply voltage that has been rectified and filtered to be DC.

15. A display device comprising:
a housing comprising reflective surfaces and a top opening through which light is emitted for backlighting a liquid crystal display (LCD) panel;
an array of substantially identical light emitting diodes (LEDs) supported on a reflective bottom surface in the housing, the LEDs being separated from one another by a distance greater that the width of a single LED; and
a diffuser above the LEDs for providing diffused light to an LCD panel,
wherein a number of LEDs are connected in series, a total voltage drop across the serially connected LEDs approximately equaling a publicly supplied standard AC supply voltage that has been rectified and filtered to be DC, wherein LEDs in the array are connected to perform a rectification of the AC supply voltage.

16. The device of claim 1 wherein the LEDs are arranged in a rectangular grid.

17. The device of claim 1 wherein the LEDs are arranged in a hexagonal grid.

18. The device of claim 1 wherein the LEDs are connected in groups of series-connected LEDs.

19. The device of claim 1 wherein the LEDs are connected such that a light output of individual LEDs or a portion of the LED array can be independently controlled to adjust the light output to improve uniformity of the light applied to the LCD panel.

20. The device of claim 1 further comprising a plurality of light sensors in the housing for detecting an intensity of light, the sensors being coupled to a controller for controlling a brightness of LEDs associated with a sensor.

21. The device of claim 1 further comprising a plurality of light sensors in the housing for detecting an intensity of light, the sensors being coupled to a controller for controlling a gray scale level of pixels in the LCD panel.

22. The device of claim 1 further comprising:
a first type of phosphor above the LEDs for converting light emitted by the LEDs to a first color, and
a second type of phosphor on the bottom surface in the housing for converting light emitted by the LEDs to a second color.

23. The device of claim 22 wherein a combination of the light emitted by the LEDs, the first type of phosphor, and the second type of phosphor produces a substantially white light for backlighting the LCD panel.

24. The device of claim 22 wherein the first type of phosphor is in the form of dots.

25. The device of claim 24 wherein the dots are deposited on the diffuser.

26. The device of claim 22 wherein the first type of phosphor converts blue light to one of red light or green light, and the second type of phosphor converts blue light to the other of red light and green light.

27. The device of claim 1 further comprising a phosphor layer for converting light from the LEDs to one or more other colors, the phosphor layer being formed on the LCD panel.

28. The device of claim 27 wherein the phosphor layer is formed on a thin film transistor transparent layer in the LCD panel.

29. The device of claim 1 wherein the reflective bottom surface in the housing comprises a bottom surface forming the housing.

30. A method for constructing a display comprising:
providing a housing comprising reflective surfaces and a top opening through which light is emitted for backlighting a liquid crystal display (LCD) panel;
providing an array of substantially identical light emitting diodes (LEDs) supported on a reflective bottom surface in the housing, the LEDs being separated from one another by a distance greater that the width of a single LED, wherein the housing has a height, and wherein a ratio of the height to a pitch of the LEDs is between approximately 0.3 to 1.2; and
providing a diffuser above the LEDs for providing diffused light to an LCD panel.

31. The method of claim 30 further comprising an LCD panel over the diffuser.

* * * * *